(12) United States Patent
Rauch, Jr.

(10) Patent No.: US 7,832,745 B2
(45) Date of Patent: Nov. 16, 2010

(54) SINGLE CASTER WHEEL ASSEMBLY FOR TRAILER TOWABLE AT HIGH SPEEDS

(76) Inventor: Joseph J. Rauch, Jr., 22095 Country Road 117, Rogers, MN (US) 55374

( * ) Notice: Subject to any disclaimer, the term of this patent is extended or adjusted under 35 U.S.C. 154(b) by 0 days.

(21) Appl. No.: 12/329,067

(22) Filed: Dec. 5, 2008

(65) Prior Publication Data
US 2009/0146388 A1 Jun. 11, 2009

Related U.S. Application Data

(60) Provisional application No. 61/019,696, filed on Jan. 8, 2008, provisional application No. 61/012,280, filed on Dec. 7, 2007.

(51) Int. Cl.
*B60B 33/00* (2006.01)
*B60G 11/22* (2006.01)
*B60G 3/02* (2006.01)

(52) U.S. Cl. ............... 280/86; 280/86.1; 280/124.128; 280/124.169; 16/44

(58) Field of Classification Search .............. 16/29, 16/34, 44, 45; 280/86, 86.1, 124.128, 124.166, 280/124.169, 124.177, 78, 79
See application file for complete search history.

(56) References Cited

U.S. PATENT DOCUMENTS

| | | | | |
|---|---|---|---|---|
| 2,227,875 A | * | 1/1941 | Boden | 16/44 |
| 2,470,978 A | * | 5/1949 | Du Brie | 16/44 |
| 2,543,948 A | * | 3/1951 | Wiedman | 16/44 |
| 2,568,261 A | * | 9/1951 | Stade | 280/405.1 |
| 2,712,742 A | * | 7/1955 | Neidhart | 464/83 |
| 2,729,442 A | * | 1/1956 | Neidhart | 267/257 |
| 3,041,656 A | * | 7/1962 | Goodall | 16/44 |
| 3,784,230 A | * | 1/1974 | Worrall, Jr. | 280/415.1 |
| 4,077,087 A | * | 3/1978 | Mooney | 16/35 R |
| 4,346,498 A | * | 8/1982 | Welsch et al. | 16/44 |
| 4,372,569 A | * | 2/1983 | Otterson | 280/78 |
| 4,437,676 A | * | 3/1984 | Kitrell | 280/78 |
| 4,511,155 A | | 4/1985 | Galloway | 280/204 |
| 4,580,808 A | | 4/1986 | Smith-Williams | 280/700 |
| 4,664,403 A | | 5/1987 | Livingston | 280/460 R |
| 4,966,386 A | | 10/1990 | Werdich | 280/700 |
| 5,277,450 A | | 1/1994 | Henschen | 280/717 |
| 5,305,496 A | * | 4/1994 | Gagnon et al. | 16/44 |
| 5,326,128 A | | 7/1994 | Cromley, Jr. | 280/656 |
| 5,397,148 A | * | 3/1995 | Nelson | 280/416.1 |
| 5,411,286 A | | 5/1995 | Pittman | 280/717 |
| 5,411,287 A | | 5/1995 | Henschen | 280/717 |

(Continued)

OTHER PUBLICATIONS

Stinger Hitch Products Stinger Hitch Helper brochure, http://www.stingerhitch.com.

(Continued)

*Primary Examiner*—Paul N Dickson
*Assistant Examiner*—Joseph Rocca
(74) *Attorney, Agent, or Firm*—Nawrocki, Rooney & Sivertson, P.A.

(57) ABSTRACT

A trailer wheel assembly for mounting on the rear of a trailer has a structure that reduces or prevents oscillations about a vertical axis arising during high speed towing. The structure includes dual wheels mounted on an axle, a resilient support, and a suspension arm extending rearwardly and downwardly from the resilient support to the axle for the wheels.

6 Claims, 3 Drawing Sheets

U.S. PATENT DOCUMENTS

| | | | | |
|---|---|---|---|---|
| 5,448,796 A * | 9/1995 | Larson | | 16/44 |
| 5,607,176 A | 3/1997 | Leib et al. | | 280/656 |
| 5,664,796 A * | 9/1997 | Huyzers | | 280/400 |
| 6,499,184 B2 * | 12/2002 | Plate | | 16/44 |
| 6,607,201 B2 * | 8/2003 | Marshburn | | 280/79 |
| 6,659,491 B2 * | 12/2003 | Green | | 280/423.1 |
| 6,752,411 B2 * | 6/2004 | Few | | 280/124.169 |
| 6,905,130 B2 * | 6/2005 | Few | | 280/124.169 |
| 6,932,388 B2 | 8/2005 | Few et al. | | 280/787 |
| 6,957,825 B2 * | 10/2005 | Peters | | 280/483 |

OTHER PUBLICATIONS

SC2101 SportCarrier™ II Operator, Parts and Installation Manual, © Blue Ox Division, http://www.blueox.us.

Fast Master Products, Inc. SWIVELWHEEL FAQ's, http://www.cruiserlift.com/swivelwheelfaq.html.

* cited by examiner

SINGLE CASTER WHEEL ASSEMBLY FOR TRAILER TOWABLE AT HIGH SPEEDS

CLAIM OF PRIOR APPLICATION FILING DATE

This is a regular application filed under 35 U.S.C. §111(a) claiming priority under 35 U.S.C. §119(e)(1), of provisional application Ser. No. 61/019,696, filed Jan. 8, 2008, and provisional application Ser. No. 61/012,280, filed Dec. 7, 2007. This reference incorporates both herein in their entirety.

BACKGROUND OF THE INVENTION

The invention pertains generally to trailer suspension systems, in particular to load bearing single wheel suspension systems used on smaller utility or recreational trailers. Transport of trailers used for various purposes such as utility or recreational vehicles require the wheel and axle assembly to operate smoothly while transporting a wide range of loads or unloaded, such as an empty trailer.

Single or multiple axle trailers are prevalent in the market with one or more wheels on each side of the trailer frame. Other designs in the market have a single wheel mounted in the rear of the trailer near its center. The towing vehicle supports the trailer at two front attachment points so the trailer swings with the vehicle during turns. Such single wheel designs often have a single downwardly and rearwardly extending arm with the wheel carried at the lower end thereof. The upper end of the arm is attached to pivot on a vertical caster shaft to allow the wheel to follow the towing vehicle during turns without scrubbing on the ground.

A particular problem with this design is the possibility at highway speeds for wheel on a single wheel trailer to begin to oscillate from side to side on the caster shaft. This may occur with such speed and violence that the axle breaks or the tire on the wheel blows out, dropping the rim to the ground and potentially damaging the trailer and its load and endangering humans.

Many believe that proper alignment of the wheel center axis with the center axis of the mounting spindle has a direct bearing on the occurrence and amount of oscillation that can occur while traveling at highway speeds. Where this is the reason for this problem, the tolerance in this alignment is relatively small. Although manufacturers have the ability to control such tolerances, doing so is expensive, and other causes of this oscillation may exist as well. For example, replacing a worn wheel may change the alignment and convert a satisfactory wheel assembly to one that is prone to oscillation.

One currently available solution to this oscillation problem is a braking unit on the spindle assembly to dampen vibrations. Such solutions may reduce the damaging effects of the vibrations but include disadvantages of further maintenance of the brake system and added complexity and cost, while not sufficiently resolving the problem. The variety of trailer chassis designs and wheel sizes available in the market creates a large margin for error when tolerances for each complete system are tight, thus creating a challenge for aftermarket and replacement parts.

For these reasons, there is a need for a single wheel trailer suspension that will operate satisfactorily with a variety of trailer and hitch assemblies that is not susceptible to oscillation during towing at highway speeds.

BRIEF DESCRIPTION OF THE INVENTION

A trailer wheel assembly for supporting the rear of a trailer is less susceptible to oscillation when towing the trailer at highway speeds. The assembly comprises a suspension arm having first and second ends and a wheel axle fixed to the suspension arm near the first end thereof. The wheel axle has a wheel axis.

First and second hubs are mounted on the wheel axle at opposite ends thereof for rotation about the wheel axis. Each hub mounts a wheel comprising a rim and tire.

A support shaft journal has an axis parallel to the wheel axis with a support shaft mounted for rotation within the support shaft journal. The support shaft is fixed to a second end of the suspension arm. The support shaft has an axis of rotation within the journal substantially parallel to the wheel axis.

A caster shaft has an end mounted on the exterior of the support shaft journal. The caster shaft has an axis of rotation substantially perpendicular to the support shaft axis of rotation. A caster shaft journal for mounting on the trailer, holds the caster shaft for rotation about a caster shaft axis. The caster shaft axis preferably is nearly vertical when in use on the trailer.

A resilient element connects between the caster shaft and at least one of the support shaft and the suspension arm, to resiliently support the suspension arm at an obtuse angle with respect to the caster shaft. In one preferred embodiment, that obtuse angle is approximately 135°.

DESCRIPTION OF THE PREFERRED EMBODIMENTS

Figure 1:
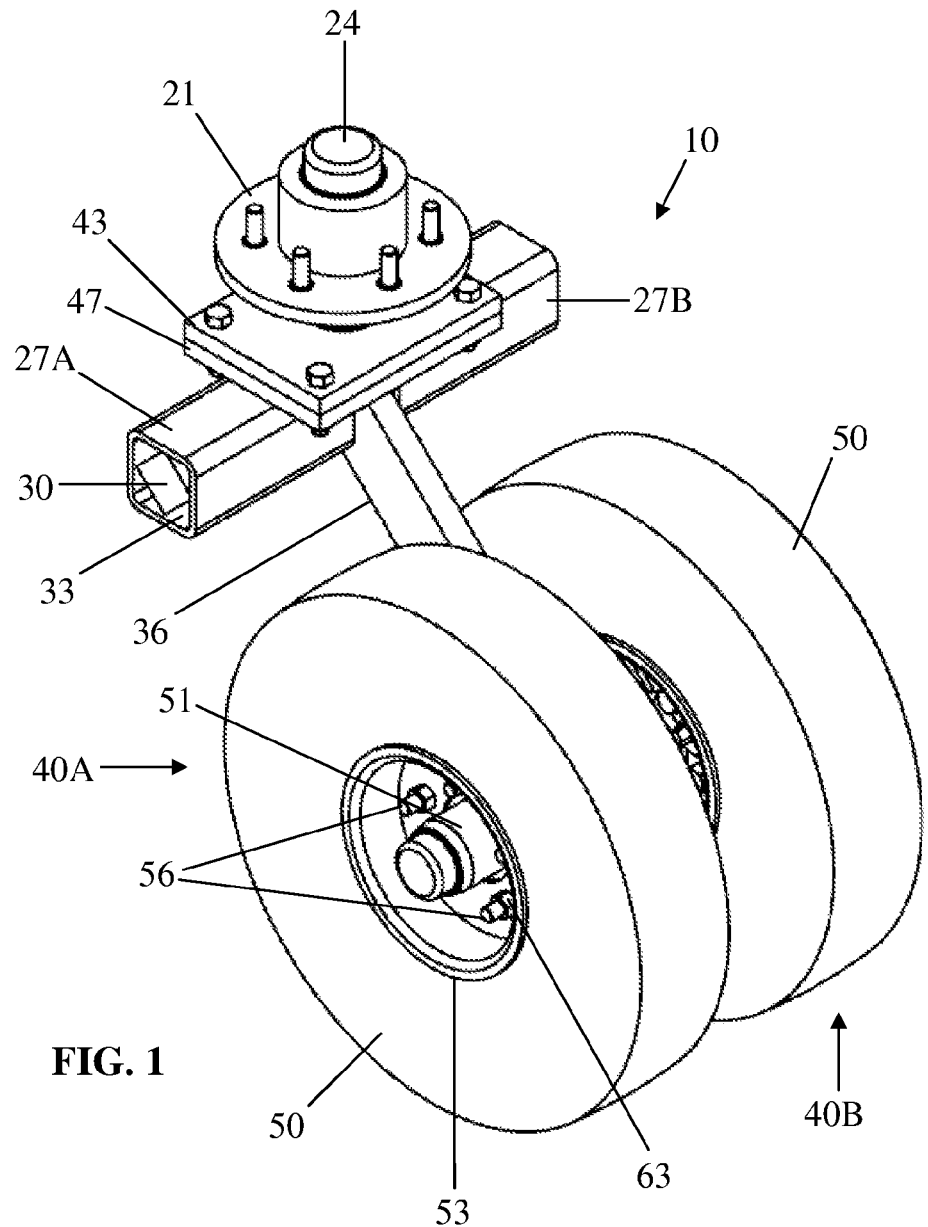
FIG. 1 is a perspective view of an assembled trailer wheel assembly.
Figure 2:
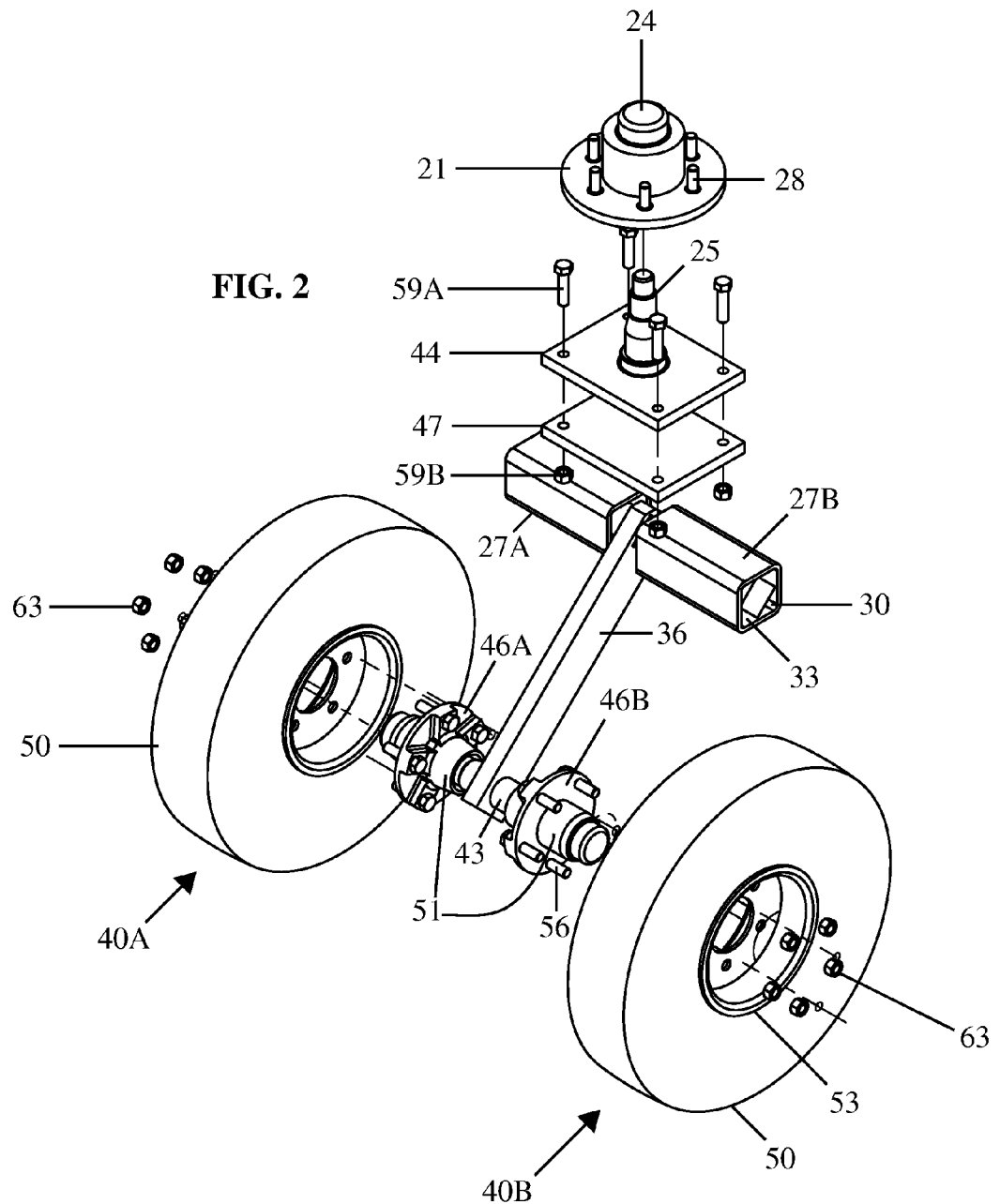
FIG. 2 is an exploded perspective view of a trailer wheel assembly.

The trailer wheel assembly 10 that FIGS. 1 and 2 shows, supports the rear of a trailer whose front is to be attached at two points to a towing vehicle. The following description suggests various dimensions known to permit high speed towing with little or no oscillation of support wheels 40A and 40B. It is very likely that these dimensions may vary to a certain extent without affecting successful operation, as defined by the absence of such oscillations. The invention includes such dimensional variations.

Assembly 10 bolts to the rear of a trailer with lugs 28 that form part of a caster flange 21. A caster spindle or shaft 25 rotates about a caster axis on bearings within a caster journal 24 forming part of flange 21. Welding attaches shaft 25 to a mounting flange 44. When assembled, flange 43 rotates freely with respect to flange 21 about the caster axis. Since the torque loading on shaft 25 is quite high, the bearings on which shaft rotates should be robust.

In use, flange 21 should attach shaft 25 to the trailer to align the caster axis with an approximately vertical axis. However, as weight is placed on the trailer and the suspension of assembly 10 deflects, the angle of the caster axis with respect to the vertical will change slightly. For the most part, slight changes in the angle that the caster axis makes with the vertical will not affect performance of assembly 10.

Welds attach a mounting plate 47 to suspension tubes 27A and 27B, to form a portion of assembly 10's suspension. Welds also attach a mounting flange 44 to caster shaft 25. Bolts 59A and nuts 59B attach flange 43 to mounting plate 47.

Wheels 40A and 40B each comprise a tire 50 mounted on a rim 53, which is an entirely conventional arrangement. Tires 50 will typically comprise one of three standard sizes with approximate dimensions as follows:

| Rim Dia. | Outside Dia. | Tread Width | Sidewall Width (Max.) |
|---|---|---|---|
| 8 in. | 18 in. | 5 in. | 7.5 in. |
| 10 | 20 | 8 | 10.5 |
| 12 | 21 | 4 | 6.5 |

Of course, the rated load for each of these sizes is different.

Wheels 40A and 40B support the rear of the trailer to which flange 21 attaches. Each rim 53 attaches to one of the hubs 46A and 46B. Hubs 46A and 46B attach to rims 53 with lugs 56 and nuts 63, as is conventional.

Hubs 46A and 46B each have a bearing journal 51 rotating on an end of axle 43 about a wheel axis. Customarily, a pair of tapered roller bearings supports each hub 46A and 46B on axle 43 to carry radial and axial loads. Thus, each wheel 40A and 40B rotates independently of the other.

It is theoretically possible to use a single rigid axle to carry both wheels where both wheels 40A and 40B rotate as one unit. Because of the availability of the normal wheel-axle configuration with rotating bearing journals 51 and a rigid axle 43, it is much simpler and easier for each wheel 40A and 40B to have its own independently rotating hub 46A and 46B. Further, a solid axle carrying both wheels 46A and 46B will cause scrub of the wheel treads during turns and transitioning between forward and reverse movement. For purposes of the invention, the two design variations may well be equivalent, but the rotating hub embodiment is preferable.

A suspension arm 36 attaches at a first end thereof to the center of axle 43, preferably with a weld. Arm 36 should be a rigid member that deflects little under any conceivable load arising during use. Arm 36 between the two attachment points thereof may be 2-4 in. (5-10 cm.) longer than one-half the outside diameter of the wheel 40A and 40B used.

Axle 43 must be long enough to allow adequate clearance for arm 36 between wheels 40A and 40B. On the other hand, it is likely that the spacing between the side walls of wheels 40A and 40B should not be substantially greater than the tread width of the tires 50, and certainly not greater than the outside diameter of a tire 50. The wider is the spacing, the more scrubbing of tires 50 occurs during the transition between forward and reverse movement by the towing vehicle.

A second end of arm 36 is fixed, preferably by welding, to the middle of a support shaft 30. Shaft 30 has a support shaft axis substantially parallel to the wheel axis about which wheels 40A and 40B rotate. Shaft 30 extends into two tubes 27A and 27B that collectively form a support shaft journal within which shaft 30 rotates.

In a preferred embodiment, tubes 27A and 27B are in coaxial alignment and rigidly connected by welding to mounting plate 47. In this preferred embodiment, both tubes 27A and 27B have substantially square interior cross sections and shaft 30 has a substantially square cross section. The walls of tubes 27A and 27b may be approximately 0.19 in. (4.76 mm.); the length of tubes 27A and 27B may be from 6-8 in.; and the cross section dimensions of the interior may be approximately 2 in. (5 cm.). The spacing between tubes 27A and 27B should be slightly greater than the width of arm 36. Shaft 30 has a 1 in. (2.5 cm.) square cross section and is long enough to extend completely through both tubes 27A and 27B.

Figure 3:
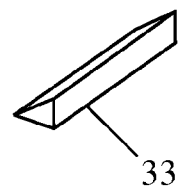
FIG. 3 shows one of the suspension bushings.

Tubes 27A and 27B cooperate with shaft 30 to absorb road shocks by providing compliance between wheels 40A and 40B and the trailer which they support. Eight resilient inserts comprising high density elastomeric material in the form of substantially triangular cross section (prismatic) bushings 33 fit between the interior corners of tubes 27A and 27B and the exterior side walls of shaft 30. FIG. 3 shows one of these bushings 33. These bushings are under substantial compression when shaft 30 receives no torque. Inserting bushings 33 requires a specialized process to be described later.

The compliance of this configuration arises from slight deformation of the bushings 33 when arm 36 applies radial and torque loads to shaft 30. This type of suspension is readily available commercially, and can provide resistance to rotation of shaft 30 sufficient to oppose hundreds of pound feet of torque with angular deflection of shaft 30 in the range of a few degrees at most. The preferred embodiment provides for a deflection of flange 21 with respect to the ground under full load (600-1000 lb. or 280-460 kg.) of perhaps an inch or two. Where less deflection is appropriate, one can increase the lengths of support shaft 30; tubes 27A, 27B; and bushings 33 to provide the necessary additional resistance to angular deflection.

Preferably, the angle of arm 36 with respect to the caster axis when the trailer is unloaded is an obtuse angle of approximately 135°. As mentioned above, as flange 21 bears more load, suspension arm 36 applies torque to angularly deflect shaft 36.

Two important relationships are necessary to provide the desired unloaded obtuse angle of 135° for arm 36. The first of these is that interior walls of both tubes 27A and 27B are perpendicular to the caster axis. With that relationship, then arm 36 should be welded to shaft 30 so that the centerline of arm 36 bisects and is perpendicular to two opposing walls of shaft 30. This places each side wall of shaft 30 in facing relation to an interior corner of tubes 27A and 27B. One can of course change the angular orientation of tubes 27A and 27B with respect to the caster axis and correspondingly alter the angular relationship of arm 30 relative to arm 36, but little design justification exists for that configuration.

The preceding structure seems to provide robust resistance to oscillation of wheels 40A and 40B about the caster axis during highway towing under a variety of loads and highway surface roughness. One expects that dimensions may be varied substantially without affecting this robust resistance, although the variances are not known at this time. All of these varied dimensions that provide such robust resistance to oscillation define designs that fit within the scope and spirit of the invention, and should be considered as such.

As mentioned above, the sequence of steps for fabricating wheel assembly 10 is critical in that the bushings 30 may be damaged or destroyed by the high heat that welding produces. Conventional practice uses a process of chilling bushings 30 prior to installing them in tubes 27A and 27B.

Figure 4:
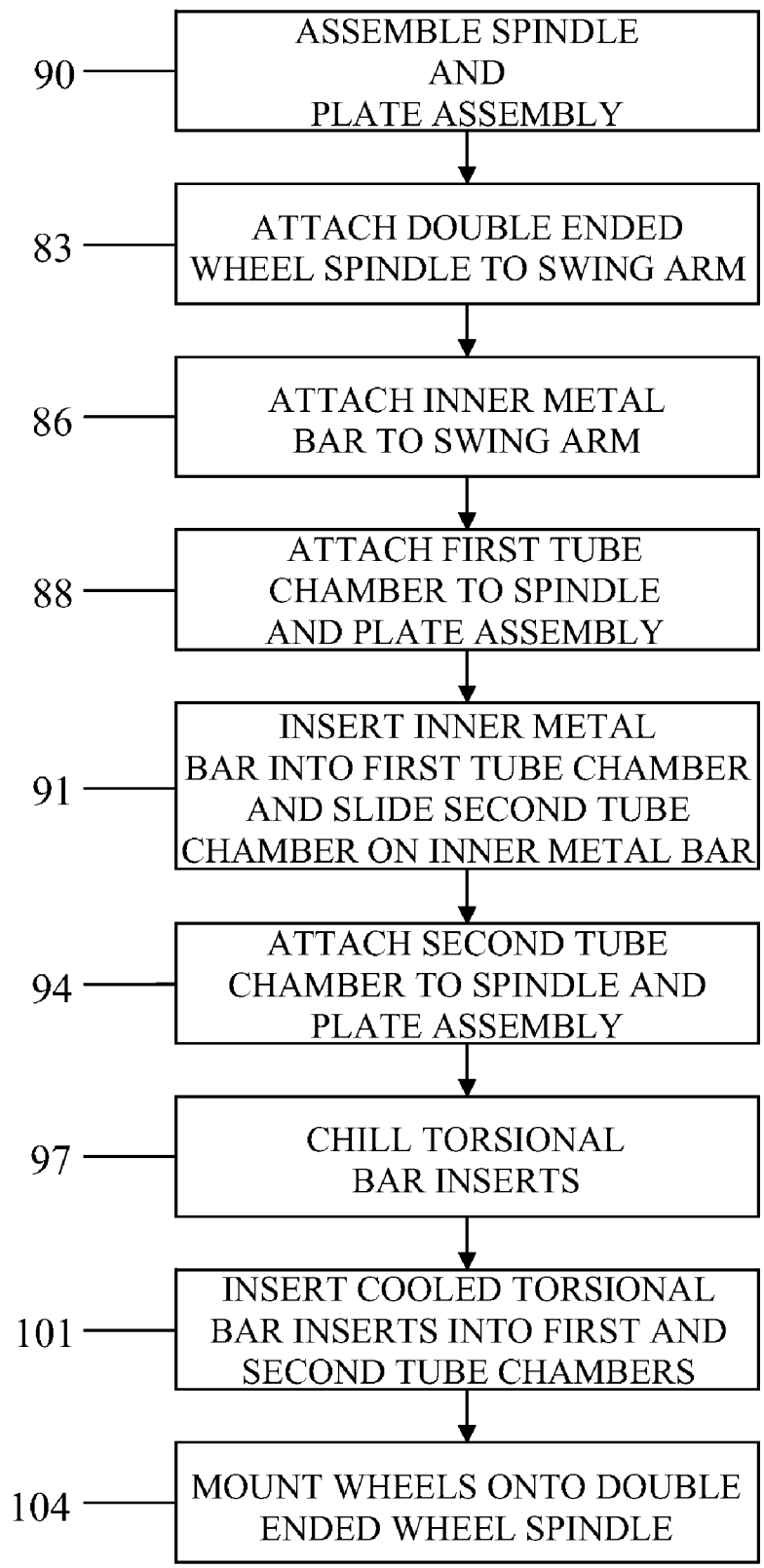
FIG. 4 shows the steps of a method for inserting the suspension bushings into the suspension unit.

FIG. 4 shows the preferred sequence of these fabrication steps. Box 80 specifies welding shaft 25 to mounting flange 44.

Box 83 specifies welding axle 43 to arm 36. Box 86 specifies welding arm 36 to axle 30. Note that the centerline of arm 36 should pass through and bisect the side walls of shaft 30.

Box 88 specifies welding one of the tubes 27A and 27B to mounting plate 47. Box 91 specifies sliding shaft 30 into the just-welded tube 27A or 27B. Box 94 specifies sliding the second of tubes 27A and 27B onto shaft 30 and then welding this tube to plate 47.

Box 97 specifies chilling the bushings 33 to shrink them sufficiently to slip into the specified prismatic passages or spaces between shaft 30 and tubes 27A, 27B. While the temperature which bushings 33 should reach is not known, completely immersing bushings 33 in liquid nitrogen for at least 1 minute cools them sufficiently.

Box 101 specifies inserting each chilled bushing 33 into one of the prismatic spaces between shaft 30 and tubes 27A and 27B. Chilling to the specified temperature causes bushings 33 to shrink substantially, so that insertion is easy. The size of these prismatic spaces specifies preferred dimensions for chilled bushings 33. One should note that such a low temperature is dangerous to unprotected skin, so appropriate protection is necessary.

At this point, assembly 10 is essentially complete. Box 104 specifies mounting wheels 40A and 40B onto hubs 46A and 46B.

While the use of a resilient bushing 33 type of suspension is preferred, other types of compliant suspensions may also succeed in resisting oscillation. For example, a coil spring or torsion bar arrangement might replace bushings 33 in providing the angular compliance or resistance to deflection of arm 36. Or a linear or angular damper or shock absorber that mechanically interfaces between plate 47 and arm 36 may successfully provide the necessary compliance. In general, any resilient connection between at least one of support shaft 30 and suspension arm 36, to at least one of the caster shaft 25 and the mounting plate 47, may be suitable for resiliently supporting the support arm at an obtuse angle with respect to the caster axis, and with adequate resistance to deflection.

What I claim is:

1. A trailer wheel assembly for supporting the rear of a trailer of the type whose front is attached to the chassis of a towing vehicle, comprising:
    a) a suspension arm having first and second ends;
    b) a wheel axle fixed to the suspension arm near the first end thereof, said wheel axle having a wheel axis;
    c) first and second hubs mounted on the wheel axle at opposite ends thereof for rotation about the wheel axis, each hub for mounting a wheel;
    d) a support shaft journal having an axis parallel to the wheel axis;
    e) a support shaft mounted for rotation within the support shaft journal, and fixed to a second end of the suspension arm, said support shaft having an axis of rotation substantially parallel to the wheel axis;
    f) a caster shaft mounted at an end thereof to the exterior of the support shaft journal, said caster shaft having an axis of rotation substantially perpendicular to the support shaft axis of rotation;
    g) a caster shaft journal for mounting on the trailer, for holding said caster shaft for rotation; and
    h) a resilient element connected between the caster shaft and at least one of the support shaft and the suspension arm, to resiliently support the suspension arm at an obtuse angle with respect to the caster shaft;
    i) wherein the suspension arm's first end is attached to the wheel axle between the wheel axle ends;
    j) wherein the suspension arm is attached to the support shaft between the ends thereof, and wherein the support shaft journal comprises first and second support tubes attached to the caster shaft in spaced, coaxial relation, with opposing ends of the support shaft projecting into the first and second support tubes, with the suspension arm between the two support tubes;
    k) the trailer wheel assembly including:
        1) a mounting plate to which the two support tubes are attached;
        2) a mounting flange to which the caster shaft is attached; and
        3) fasteners attaching said mounting plate to said mounting flange.

2. The trailer wheel assembly of claim 1, wherein the resilient element comprises in each support tube, a resilient bushing in deforming contact with the support tube and the support shaft, to provide substantial resistance to rotation of the support shaft relative to the support tubes.

3. The trailer wheel assembly of claim 2, wherein the resilient bushing supports the support shaft with an unloaded angular orientation placing the suspension arm at an obtuse angle with respect to the caster shaft of approximately 135°.

4. The trailer wheel assembly of claim 1, wherein the suspension arm attaches to the wheel axle approximately at the midpoint between the wheel axle ends.

5. The trailer wheel assembly of claim 4, wherein the wheel axle is designed to mount substantially identical wheels each having a predetermined width, and the hubs mount the wheels with the spacing between the wheels similar to the predetermined wheel width.

6. The trailer wheel assembly of claim 1, wherein the wheel axle is designed to mount substantially identical wheels each having a predetermined outside diameter, and wherein the suspension arm length is approximately equal to $3/4$ to $1 1/4$ times the outside diameter of the wheels.

* * * * *